May 7, 1929.  E. R. HOLMES  1,711,600
RELEASING DEVICE FOR TAKE-UP DRIVING MECHANISM
Filed Sept. 26, 1925
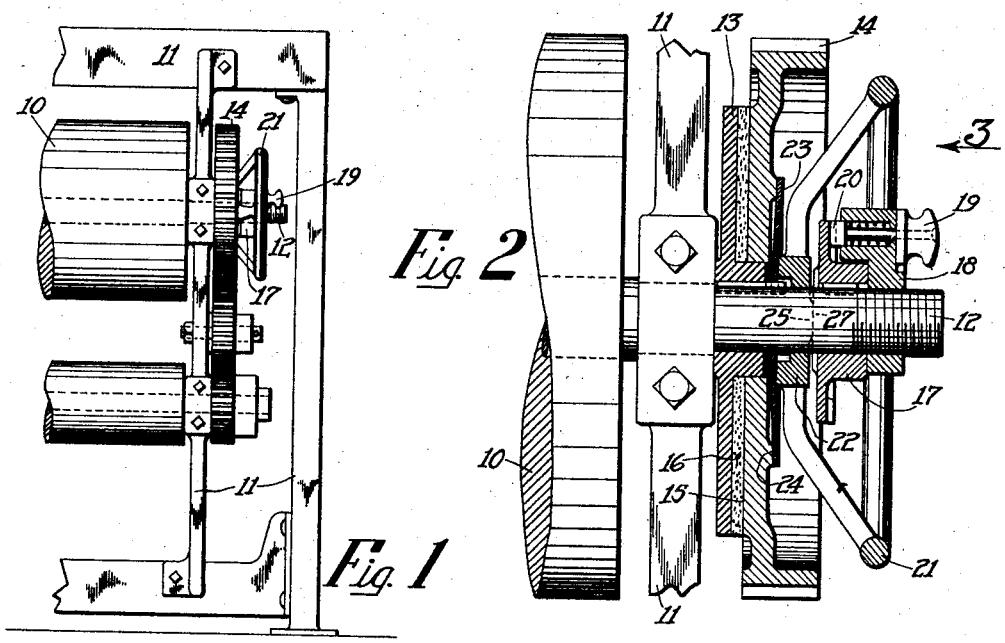
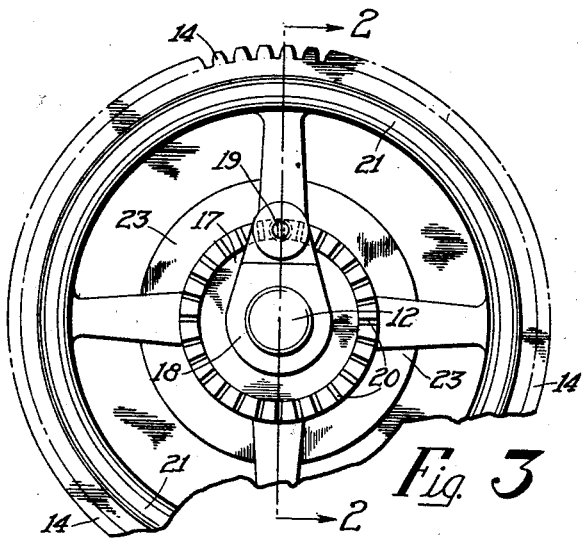
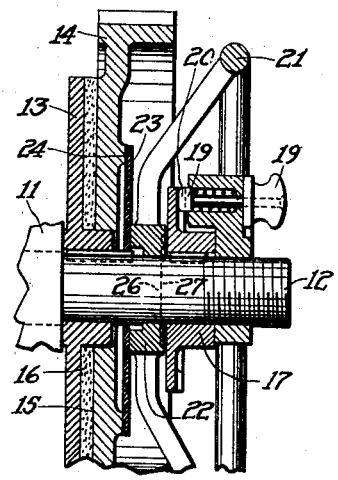
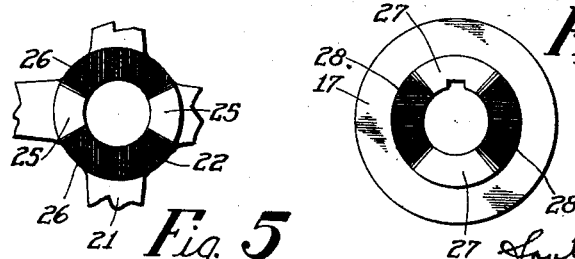
Inventor
Elbridge R. Holmes
Southgate Fay & Hawley
Attorneys

Patented May 7, 1929.  1,711,600

UNITED STATES PATENT OFFICE.

ELBRIDGE R. HOLMES, OF WORCESTER, MASSACHUSETTS, ASSIGNOR TO CROMPTON & KNOWLES LOOM WORKS, OF WORCESTER, MASSACHUSETTS, A CORPORATION OF MASSACHUSETTS.

RELEASING DEVICE FOR TAKE-UP DRIVING MECHANISM.

Application filed September 26, 1925. Serial No. 58,718.

This invention relates to a loom and particularly to an improved device for releasing the friction drive of a take-up roll. In the operation of a loom, it is frequently necessary to release the take-up roll and to turn the same backward or forward independently of the take-up driving mechanism. It is also customary to drive the take-up roll through a friction connection and to give the driving mechanism a movement in excess of that actually required for taking up the cloth, the excess motion being permitted by the friction connection.

It is the object of my invention to provide a construction by which the take-up roll may be conveniently released and thereafter restored to driving relation with the driving mechanism without changing the adjustment of the friction connection. The friction or tension upon the cloth is thus maintained uniform, which is a matter of great importance in the manufacture of even and perfect fabric.

With this general object in view, my invention relates to certain arrangements and combinations of parts which will be hereinafter described and more particularly pointed out in the appended claims.

A preferred form of the invention is shown in the drawings in which

Fig. 1 is a front elevation of certain parts of a loom take-up mechanism;

Fig. 2 is an enlarged sectional front elevation of my improved releasing device, taken along the line 2—2 in Fig. 3;

Fig. 3 is an end view of the parts shown in Fig. 2;

Fig. 4 is a view similar to Fig. 2 but showing the parts in a different position, and Figs. 5 and 6 are detail views to be described.

Referring to the drawings, I have shown a take-up roll or drum 10 mounted in bearings in a loom frame 11 and provided with a shaft or gudgeon 12 to which is keyed a friction plate 13. A gear 14 is loosely mounted on the hub of the plate 13 and is provided with a friction surface 15 which is preferably faced with a layer of leather 16. A collar 17 is keyed to the shaft 12 but may be adjusted axially thereon by means of a nut 18 carrying a spring plunger 19 adapted to engage with any one of a series of notches 20 (Fig. 3) on the collar 17. A hand wheel 21 is loosely mounted on the shaft 12 between the gear 14 and the collar 17.

One face of the hub 22 of the hand wheel engages a spring plate or disc 23 near the center thereof, while at its periphery the plate 23 engages a projecting annular surface 24 on the inside of the gear 14. The disc 23 is keyed and slidable on the shaft 12.

The hub 22 of the hand wheel 21 is provided with raised spots 25 having beveled edges and with intervening depressions 26, all as clearly shown in Fig. 5. The collar 17 has similar raised spots 27 and depressions 28, as shown in Fig. 6. The spots 25 and 27 are on adjacent faces of the hand wheel and collar, as shown in Fig. 2.

When the spots 25 and 27 are aligned with each other as in Fig. 2, the center of the plate 23 is sprung out of its normal position and the plate provides a definite friction tension upon the take-up roll 10 through the friction plate 13 and gear 14. The amount of this friction may be readily adjusted by turning the nut 18 upon the shaft 12, the nut being held in any adjusted position by the plunger 19 and notches 20.

When it is desired to release the take-up roll, it is merely necessary to turn the hand wheel 21 until the spots 25 on the hub of the hand wheel are aligned with recesses 28 on the collar 17. The pressure on the plate 23 is thus released, as shown in Fig. 4, and the take-up roll 10 may be freely rotated relative to its driving gear 14.

The driving mechanism may be again connected to the take-up roll by merely turning the hand wheel 21 to bring the raised spots 25 and 27 again into alignment, the hand wheel remaining in this relative position during the normal operation of the loom.

Having thus described my invention and the advantages thereof, I do not wish to be limited to the details herein disclosed otherwise than as set forth in the claims but what I claim is:—

1. In a loom, a take-up roll fixed to a shaft, a driving gear loosely rotatable about the axis of said shaft, friction connections between said gear and roll, a device to adjust the friction pressure of said connections, a spacing member between said friction connections and said adjusting device, said spacing member being loosely rotatable on said shaft but said adjusting device and said spacing member normally rotating with said shaft, and said adjusting device and spacing member having co-operating projections and intervening depressions on adjacent surfaces, means interposed between the spacing member and the gear through which the friction driving pressure is applied when said projections and depressions are aligned with each other and being released when said projections and depressions are manually moved out of alignment with each other, said spacing member having an outwardly projecting portion by which said member may be manually grasped and turned angularly relative to said shaft and adjusting device.

2. In a loom, a take-up roll fixed to a shaft, a driving gear loosely rotatable about the axis of said shaft, friction connections between said gear and roll, a device to adjust the friction pressure of said connections, a spacing member between said friction connections and said adjusting device, said spacing member being loosely rotatable on said shaft but said adjusting device and said spacing member normally rotating with said shaft, and said adjusting device and spacing member having cooperating projections and intervening depressions on adjacent surfaces, a spring plate or disk interposed between the spacing member and the gear through which the friction driving pressure is applied when said projections and depressions are aligned with each other and being released when said projections and depressions are manually moved out of alignment with each other, said spacing member having an outwardly projecting portion by which said member may be manually grasped and turned angularly relative to said shaft and adjusting device.

In testimony whereof I have hereunto affixed my signature.

ELBRIDGE R. HOLMES.